Oct. 30, 1951     L. G. MACIP     2,573,106
FOLDABLE CARRIAGE FOR CHILDREN
Filed July 19, 1947
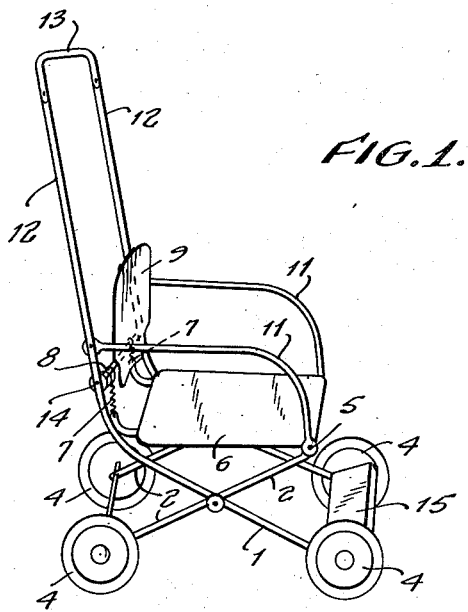
FIG.1.
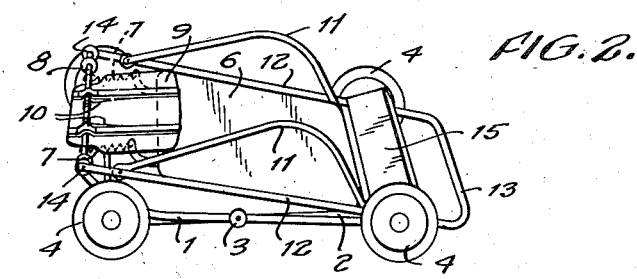
FIG.2.
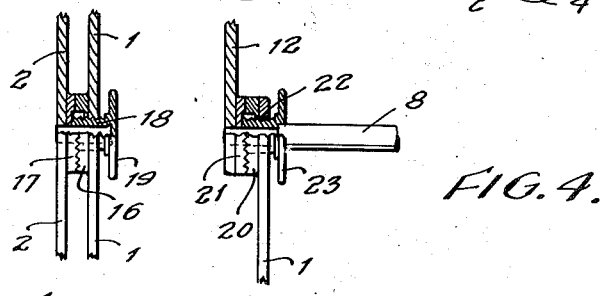
FIG.4.
FIG.3.
INVENTOR.

Patented Oct. 30, 1951

2,573,106

UNITED STATES PATENT OFFICE 2,573,106

FOLDABLE CARRIAGE FOR CHILDREN

Luis Gelambi Macip, Barcelona, Spain

Application July 19, 1947, Serial No. 762,171
In Spain August 9, 1941

Section 1, Public Law 690, August 8, 1946
Patent expires August 9, 1961

5 Claims. (Cl. 280—41)

My present invention relates to foldable carriages for children.

It is an object of my present invention to provide a folding carriage which can be easily handled and is convenient in use.

It is another object of my present invention to provide a folding carriage which is extremely sturdy in construction and nevertheless, very light in weight.

Still another object of my present invention consists in providing a folding carriage of the above type which takes up a very small space in folded position.

It is also an object of my present invention to provide a folding carriage which can be easily carried with one hand and, if folded, takes up so little space that it can be placed without any difficulty in any vehicle, e. g. an automobile.

Finally, it is also an object of my present invention to provide a folding carriage which is very easy to handle, i. e. which can be folded and unfolded by anybody without any special skill.

With the above objects in view, the folding carriage proposed by me is composed of a series of cooperating elements, namely, two pairs of stays, each of the pairs of stays composed of one forwardly ascending stay and one rearwardly ascending stay crossing each other, a pair of connecting means each turnably connecting one of these pairs of stays at their crossing point, wheels turnably pivoted to the bottom ends of all the stays, a seat member pivoted to the upper front ends of the forwardly ascending stays, a rear connecting bar connecting the upper ends of the rearwardly ascending stays, spring means turnably attached at one of its ends to the seat member and at the other of its ends to the rear connecting bar suspending the seat member from the rear connecting bar, a U-shaped handle bar pivotally attached to the upper ends of the rearwardly ascending stays, and two arm bars each pivoted at its front end to the upper end of one of these forwardly ascending stays and at its rear end to the U-shaped handle bar at a slight distance from the upper ends of the rearwardly ascending stays.

In accordnce with a preferred embodiment, I equip a folding carriage of the above type with a back member turnably pivoted to the rear connecting bar and with spring means resiliently holding this back member in proper upright position when the carriage is in operative position.

I have also found it advisable, in order to keep the carriage in operative position, to provide securing means each combined with one of the connecting means for preventing turning of the stays relative to each other.

The same purpose is served by the provision of means preventing turning of the U-shaped handle bar relative to the upper ends of the rearwardly ascending stays, whenever desired.

Finally, I have found it advisable to provide a foot rest secured to the bottom ends of the rearwardly ascending stays between the wheels pivoted to the same.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a perspective view of a folding carriage according to my present invention, in operative position;

Fig. 2 is a perspective view of the folding carriage shown in Fig. 1, in folded position;

Fig. 3 is a partial end view, partly in cross section, of the connecting and securing means pivoting the stays to each other; and Fig. 4 is a partial end view, partly in cross section, of the connecting and securing means pivoting the handle bar to the upper ends of the stays.

As clearly shown in the drawings, the folding carriage according to my present invention is composed mainly of two rearwardly ascending stays 1 and two forwardly ascending stays 2 turnably secured to each other by the connecting means 3 which will be described further below in detail.

The rear upper ends of the rearwardly ascending stays 1 are connected with each other by the rear connecting bar 8 and the upper ends of the forwardly ascending stays 2 are connected with each other by a front connecting bar not clearly shown in the drawings.

The seat member 6 is secured turnably to this front connecting bar and the upper end of the stays 2 by pivoting means 5. The rear edge of seat member 6 is secured by means of brackets and spring 7 to the rear connecting bar 8, as clearly shown in Figs. 1 and 2.

Furthermore, wheels 4 are pivoted to the bottom ends of the stays 1 and 2, as shown. These bottom ends of the stays are preferably also connected by connecting bars as shown in Fig. 1.

A U-shaped handle bar consisting of the two legs 12 and the cross bar 13 is pivoted at its lower end by means of combined pivots and securing means 14 to the upper ends of the stays 1. The constructive details of these pivots 14 will be described farther below in detail.

Furthermore, a back support 9 is resiliently secured by means of springs 10 to the connecting bar 8 so as to be in proper upright position when the carriage is in its operative condition shown in Fig. 1.

In addition to the above listed elements, my folding carriage comprises two arm bars 11 pivoted to the front ends of the stays 2 by the pivoting means 5 described above and turnably secured to the legs 12 of the handle bar described above and shown in Figs. 1 and 2.

Finally, the foot rest 15 is secured to the bottom ends of the stays 1, as clearly shown in the drawings.

A folding carriage of this type can easily be folded from its operative position shown in Fig. 1 into its folded position shown in Fig. 2. It should be stressed that such folding is made possible partly by the springs 7 arranged as described above.

In order to enable securing of the stays 1 and 2 to each other in any desired position, I combine with each of the stays 2 a disc shaped member 17 having a serrated surface adapted to cooperate with the serrated surface of a corresponding disc shaped member 16 secured to stay 1 as shown in Fig. 3.

Furthermore, I provide a screw 18 passing through holes in stay 1 and the discs 16 and 17 and turnably secured at its end to stay 2. This screw engages a screw threading provided in the holes arranged in stay 1 and disc 16. At the other end of screw 18 I provide a knob 19 by which it is possible to turn the screw 18. It is evident that turning of the screw 18 in one direction will force the serrated surfaces of the discs 16 and 17 towards each other preventing turning of the stays 1 or 2 relative to each other. Turning of knob 19 in opposite direction will free the stays and enable folding and unfolding of the carriage.

Similarly, at the bottom end of each of the legs 12 I provide a disc 21 having a serrated surface engaging the serrated surface of a disc 20 secured to the top end of the corresponding stay 1. I also provide a screw 22 which is turnably secured to disc 21 and engages a screw threading in the holes provided in disc 20 and stay 1. Turning of knob 23 provided at the end of screw 22 will force the serrated surfaces of discs 20 and 21 towards and away from each other thus preventing and enabling, respectively, turning of the handle bar relative to the stay 1.

In order to enable attachment of the rear connecting bar 8 to the stays, the screw 22 is provided with a hole through which the bar 8 is passing, as clearly shown in Fig. 4.

It will be understood that each of the elements described above, or two or more together, may also find a useful application in other types of folding carriages, differing from the types described above.

While I have illustrated and described the invention as embodied in folding carriages of the type described above, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. In a folding carriage for children in combination two pairs of stays, each of said pairs of stays arranged crossing each other; a pair of connecting means each turnably connecting one of said pairs of stays at their crossing point; wheels turnably pivoted to the bottom ends of said stays; a front connecting bar connecting the upper front ends of said stays; a rear connecting bar connecting the upper rear ends of said stays; a back member turnably pivoted to said rear connecting bar; spring means resiliently holding said back member in proper upright position when said carriage is in operative position; a seat member pivoted at its front edge to said front connecting bar; a spring means turnably attached to the rear edge of said seat member and secured to said rear connecting bar so as to resiliently suspend said seat member from said rear connecting bar; a U-shaped handle bar pivotally attached to the upper rear ends of said stays; and two arm bars each pivoted at its front end to the upper front end of one of said stays and at its rear end to one leg of said U-shaped handle bar.

2. In a folding carriage for children in combination two pairs of stays, each of said pairs of stays composed of one forwardly ascending stay and one rearwardly ascending stay crossing each other; a pair of connecting means each turnably connecting one of said pairs of stays at their crossing point; wheels turnably pivoted to the bottom ends of all said stays; a seat member pivoted to the upper front ends of said forwardly ascending stays; a rear connecting bar connecting the upper ends of said rearwardly ascending stays; a back member turnably mounted on said rear connecting bar; first spring means secured to said rear connecting bar and tending to hold said back member in upright position; second spring means turnably attached at one of its ends to said seat member and at the other of its ends to said rear connecting bar suspending said seat member from said rear connecting bar; a U-shaped handle bar pivotally attached to the upper ends of said rearwardly ascending stays; and two arm bars each pivoted at its front end to the upper end of one of said forwardly ascending stays and at its rear end to said U-shaped handle bar at a slight distance from the upper ends of said rearwardly ascending stays.

3. In a folding carriage for children in combination two pairs of stays, each of said pairs of stays composed of one forwardly ascending stay and one rearwardly ascending stay crossing each other; a pair of connecting means each turnably connecting one of said pairs of stays at their crossing point; wheels turnably pivoted to the bottom ends of all said stays; a seat member pivoted to the upper front ends of said forwardly ascending stays; a rear connecting bar connecting the upper ends of said rearwardly ascending stays; a back member turnably mounted on said rear connecting bar; first spring means secured to said rear connecting bar and tending to hold said back member in upright position; second spring means turnably attached at one of its ends to said seat member and at the other of its ends to said rear connecting bar suspending said seat member from said rear connecting bar; a U-shaped handle bar composed of two parallel legs and a cross member; a pair of connecting means each turnably connecting the free end of one leg of said U-shaped handle bar to the upper end of one of said rearwardly ascending stays; and two arm bars each pivoted at its front end to the upper end of one of said forwardly ascending stays and at its rear end to one leg of said U-shaped handle bar at a slight distance from the upper ends of said rearwardly ascending stays.

4. In a folding carriage for children in combination two pairs of stays, each of said pairs of stays composed of one forwardly ascending stay and one rearwardly ascending stay crossing each other; a pair of connecting means each turnably connecting one of said pairs of stays at their connecting point; manually operable securing means each combined with one of said connecting means for preventing turning of said stays relative to each other whenever desired; wheels turnably pivoted to the bottom ends of all said stays; a seat member pivoted to the upper front ends of said forwardly ascending stays; a rear connecting bar connecting the upper ends of said rearwardly ascending stays; a back member turnably mounted on said rear connecting bar; first spring means secured to said rear connecting bar and tending to hold said back member in upright position; second spring means turnably attached at one of its ends to said seat member and at the other of its ends to said rear connecting bar suspending said seat member from said rear connecting bar; a U-shaped handle bar pivotally attached to the upper ends of said rearwardly ascending stays; manually operable means preventing turning of said U-shaped handle bar relative to the upper ends of said rearwardly ascending stays; whenever desired; and two arm bars each pivoted at its front end to the upper end of one of said forwardly ascending stays and at its rear end to said U-shaped handle bar at a slight distance from the upper ends of said rearwardly ascending stays.

5. In a folding carriage for children in combination two pairs of stays, each of said pairs of stays composed of one forwardly ascending stay and one rearwardly ascending stay crossing each other; a pair of connecting means each turnably connecting one of said pairs of stays at their crossing point; wheels turnably pivoted to the bottom ends of all said stays; a seat member pivoted to the upper front ends of said forwardly ascending stays; a rear connecting bar connecting the upper ends of said rearwardly ascending stays; a back member turnably mounted on said rear connecting bar; first spring means secured to said rear connecting bar and tending to hold said back member in upright position; second spring means turnably attached at one of its ends to said seat member and at the other of its ends to said rear connecting bar suspending said seat member from said rear connecting bar; a U-shaped handle bar pivotally attached to the upper ends of said rearwardly ascending stays; two arm bars each pivoted at its front end to the upper end of one of said forwardly ascending stays and at its rear end to said U-shaped handle bar at a slight distance from the upper ends of said rearwardly ascending stays; and a foot rest secured to the bottom ends of said rearwardly ascending stays between the wheels pivoted to the same.

LUIS GELAMBI MACIP.

REFERENCES CITED

The following references are of record in the file of this patent:

UNITED STATES PATENTS

| Number | Name | Date |
| --- | --- | --- |
| 1,855,567 | Brown | Apr. 26, 1932 |
| 1,926,357 | Westphal | Sept. 12, 1933 |
| 2,029,247 | Mercogliano | Jan. 28, 1936 |

FOREIGN PATENTS

| Number | Country | Date |
| --- | --- | --- |
| 648,644 | France | Dec. 12, 1928 |